(12) United States Patent
Bosch-Charpenay et al.

(10) Patent No.: US 7,546,208 B2
(45) Date of Patent: Jun. 9, 2009

(54) METHOD AND APPARATUS OF SIGNAL PROCESSING FOR USE IN SPECTROMETRY USING AN IMPROVED APODIZATION FUNCTION

(75) Inventors: Sylvie Bosch-Charpenay, Vernon, CT (US); Barbara J. Marshik-Geurts, Methuen, MA (US); Leonard I. Kamlet, Andover, MA (US); Jorge E. Neira, Gaithersburg, MD (US); David F. Marran, Durham, CT (US)

(73) Assignee: MKS Instruments, Inc., Wilmington, MA (US)

( * ) Notice: Subject to any disclaimer, the term of this patent is extended or adjusted under 35 U.S.C. 154(b) by 761 days.

(21) Appl. No.: 11/074,307

(22) Filed: Mar. 7, 2005

(65) Prior Publication Data

US 2006/0241491 A1  Oct. 26, 2006

(51) Int. Cl.
*G01R 13/00* (2006.01)
*G06F 19/00* (2006.01)
(52) U.S. Cl. ........................................... 702/1; 702/66
(58) Field of Classification Search ................ 702/1, 702/66, 70, 71, 76, 77, 189; 250/281, 282, 250/291, 292
See application file for complete search history.

(56) References Cited

U.S. PATENT DOCUMENTS

| 4,479,859 A | 10/1984 | McDonald et al. |
| 4,761,545 A * | 8/1988 | Marshall et al. ............. 250/291 |
| 5,349,359 A | 9/1994 | Dallaire et al. |
| 5,463,493 A | 10/1995 | Shah |
| 5,654,542 A * | 8/1997 | Schubert et al. ............. 250/282 |
| 5,686,922 A | 11/1997 | Stankwitz et al. |
| 6,025,913 A | 2/2000 | Curbelo |
| 6,298,363 B1 | 10/2001 | Iannuzzelli |
| 6,436,044 B1 | 8/2002 | Wang |
| 6,838,877 B2 | 1/2005 | Heid et al. |

FOREIGN PATENT DOCUMENTS

| EP | 1 016 857 A2 | 7/2000 |
| EP | 1 016 857 A3 | 7/2002 |

(Continued)

OTHER PUBLICATIONS

Griffiths et al., Fourier Transform Infrared Spectrometry, "Apodization", pp. 15-25 (1986).

(Continued)

*Primary Examiner*—Bryan Bui
(74) *Attorney, Agent, or Firm*—Proskauer Rose LLP

(57) ABSTRACT

A method and apparatus is disclosed for signal spectrometry using an improved apodization function. Such method and apparatus involve (i) obtaining sample and reference time domain waveforms; (ii) applying sample and reference apodization waveforms to the sample and reference time domain waveforms, such that substantially same weight is applied to corresponding substantially coextensive regions of the sample and reference time domain waveforms, (iii) transforming the sample and reference apodized waveforms from the time domain into the frequency domain; and (iv) generating referenced spectral analysis waveform for signal analysis from a ratio of the transformed sample and reference frequency spectra, the spectral analysis waveform substantially excluding frequencies associated with the corresponding substantially coextensive regions of the apodized sample and reference time domain waveforms.

24 Claims, 10 Drawing Sheets

FOREIGN PATENT DOCUMENTS

WO          WO/97/12257          4/1997

OTHER PUBLICATIONS

Stankwitz et al., IEEE, "Spatially Variant Apodization for Sidelobe Control in SAR Imagery," pp. 132-137 (1994).

Thomas et al., IEEE, "Sidelobe Apodization in Fourier Imaging," pp. 1369-1373 (2001).

Varshney et al., IEEE, "Sidelobe Reduction for Matched Filter Range Processing," pp. 446-452 (2003).

Wallace et al., IEEE, "Measurements Comparing the Linearly Propogated Field Using an Effective Apodization and the Nonlinearly Generated Second Harmonic Field," pp. 453-456 (2003).

Yang et al., http://www.dtc.army.mil/hpcs/1999/yang.com, "High Performance Computing Workshop 1999—Real-Time Detection with a Hyperspectral Imaging Sensor," pp. 1-12 (Jun. 10, 2005).

Zhu et al., Applied Spectroscopy, "Extending the Range of Beer's Law in FT-IR Spectrometry. Part I: Theoretical Study of Norton-Beer Apodization Functions," 52:11, pp. 1403-1408 (1998).

Zhu et al., Applied of Spectroscopy, "Extending the Range of Beer's Law in FT-IR Spectrometry. Part II: Theoretical Study of Continuous Apodization Functions," 52:11, pp. 1409-1413 (1998).

International Search Report for International Application No. PCT/US2006/007652 (4 pages).

Baghdadi, Aslan, "Implicit Apodization of Interferograms in Fourier Transform Spectroscopy," Applied Spectroscopy USA, vol. 37, No. 6, 1983, pp. 520-523.

Ben-David, Avishai, "Computation of a Spectrum from a Single-Beam Fourier-Transform Infrared Interferogram," Applied Optics, Optical Society of America, vol. 41, No. 6, 2002, pp. 1181-1189.

Thomas, Gabriel, "Time-Frequency Analysis Using Sidelobe Apodization," Advanced Signal Processing Algorithms, Architectures, and Implementations XI, Proceedings of SPIE, vol. 4474, 2001, pp. 25-34.

Written Opinion of the International Searching Authority, PCT/US2006/007652 (5 pages).

* cited by examiner

Hanning

Uniform

Welch

Trapezoidal

METHOD AND APPARATUS OF SIGNAL PROCESSING FOR USE IN SPECTROMETRY USING AN IMPROVED APODIZATION FUNCTION

BACKGROUND

In spectrometry, an interferogram or free induction decay contains the raw signals from different signal components produced by the excitation method of a spectrometer. Such excitation results in an oscillating signal that is a function of amplitude versus time. Different regions of the interferogram in the time domain contain information that can increase the signal-to-noise ratio or increase the resolution between neighboring peaks of its corresponding spectrum in the frequency domain. The increase in one, however, typically results in a tradeoff of the other.

Since interferograms can only be measured out to some finite time, all experimental interferograms are finite. Upon transforming the finite time-based interferogram into the frequency domain using a technique such as the Fourier Transform, the resulting spectrum includes an observable "ringing," sometimes referred to as Gibbs phenomenon. This ringing, also described as truncation error, is preferably avoided because it can interfere with the spectral analysis of the signal components. In spectrometry, application of an apodization function to an interferogram signal can help reduce Gibbs phenomenon ringing as well as eliminate unwanted side lobes in the resulting frequency spectra.

FIG. 1 is a diagram illustrating a number of several standard apodization functions and their corresponding waveforms. Standard apodization functions include Bartlett (triangle) 5a, Blackman 5b, Connes 5c, Cosine 5d, Gaussian 5e, Hamming 5f, Hanning 5g, Uniform (boxcar) 5h, Welch 5i, trapezoidal 5j, Norton-Beer (strong, medium and weak), Happ-Genzel, Exponential decay, Gaussian decay, and other single- or double-sided apodization functions known to those skilled in the art.

Apodization functions are used to apply a weight profile to an interferogram prior to its transformation into the frequency domain. Since different sections of the interferogram correspond to signals of different oscillation frequencies, the shape of the corresponding weight profile produced by an apodization function can enhance the signals of certain frequencies and reduce others.

Low frequency signals are typically characterized as having broad spectral peaks that are gaussian in shape. In the case of infrared spectrometry, such broad spectral peaks are several hundreds or thousands of wavenumbers in width. Instrument functions representing the characteristics of a spectrometer and optical response signals resulting from spectrometry of certain solid materials are representative of low frequency signals.

Medium frequency signals are typically characterized as having medium width spectral peaks resembling the lineshape of a Lorentzian-Gaussian mix. In the case of infrared spectrometry, such medium width peaks are several tens of wavenumbers in width. Optical response signals resulting from infrared spectrometry of most solids, liquids and some gases are representative of medium frequency signals. Medium frequency signals can also be associated with instrument functions that represent characteristics of a spectrometer in the form of, for example, artifacts arising from thin film or coating interferences.

High frequency signals are typically characterized as having narrow Lorentzian peaks. In the case of infrared spectrometry, such narrow peaks are several wavenumbers wide or less. These high frequency signals are typically associated with optical response signals resulting from infrared spectrometry of gases. Another contributor to the interferogram that is composed of high frequency components is that of random noise.

Standard apodization functions typically apply a continuously decaying weight profile in which high weights are applied to interferogram points that correspond to the low frequency signals (e.g., low interferogram point numbers) and lower weights are applied, down to zero for some apodization functions, to the latter interferogram points that correspond to high frequency signals. After transformation, the "ringing" around the narrow, high frequency peaks in the resulting spectra can be significantly reduced and the random noise in the system is suppressed.

The choice of the apodization function generally resides in a trade-off between resolution of the signal frequencies and truncation error or artifact ringing. Frequencies that are very close together can be resolved if the interferogram oscillation is allowed to continue until the frequencies begin to separate from each other. In other words, to obtain high resolution, an apodization function that completely suppresses the signals at the high frequency end (i.e., the latter interferogram point numbers) reduces the ability to resolve narrow peaks.

Thus, the apodization function that is typically used for retaining the highest resolution is the boxcar apodization function. This function is the same as multiplying the interferogram by the value of one across most of time decay and then multiplying by zeros at or near the end of the interferogram. The boxcar apodization function provides the best resolution for that particular system but the worst ringing in the frequency domain. Conversely, an apodization function which decays smoothly to zero at the end of an interferogram, such as the cosine apodization function, provides worse resolution but better elimination of the ringing in the frequency domain.

For more information on standard apodization functions, refer to Peter R. Griffiths and James A. de Haseth, Fourier Transform Infrared Spectrometry, Wyley Interscience (1986) (hereinafter "Griffiths et al"), the entire contents of which are incorporated herein by reference.

SUMMARY OF THE INVENTION

Apodization functions have been used in many time varying spectroscopic techniques, such as infrared spectrometry. One type of infrared spectrometry in which apodization functions are utilized is referred to as Auto-Referenced Fourier Transform Infrared (AR-FTIR) spectrometry. For example, auto-referenced infrared spectrometry has been used for chemical analysis in which an auto-referenced frequency spectrum corresponding to the optical absorbance or reflectance of a sample is generated and utilized for quantification of very low component concentrations of constituent chemical components.

Auto-referenced infrared spectrometry typically involves the use of an original interferogram of sample, which is then deresolved into another interferogram of lower resolution, which is then used for removal of low frequency signals. In the case of chemical analysis, the original interferogram represents the optical absorbance or reflectivity of the sample from a spectrometer. The original and deresolved time domain interferograms are then converted into corresponding frequency domain single beam spectrums using a method such as a Fourier Transform. For quantification purposes in general, the single beam spectrum of the deresolved interferogram is used as the background signal and the original resolution single beam spectrum is used as the sample signal. The sample and background single beam spectrums are then converted into an auto-referenced frequency spectrum by the log of the ratio of the deresolved single beam over the original single beam. The resulting auto-referenced spectrum removes low and some medium frequency signals of the original spectrum along with random noise, but keeps the high frequency signals such that the sensitivity to the spectral information from the sample as opposed to that of the instrument is improved.

In such auto-referencing methods, apodization functions are used to weight the sample and deresolved time domain interferogram that generate the original and deresolved spectra such that the desired profile of the auto referenced spectra is produced (i.e., retaining the high frequency signals and eliminating or reducing the low frequency signals). Known apodization functions typically apply a continuously decaying weight profile in which high weights are applied to interferogram points that correspond to the low frequency signals (e.g., low interferogram point numbers) and lower weights are applied, down to zero for some apodization functions, to the latter interferogram points that correspond to high frequency signals.

However, known apodization functions do not effectively weight the original and deresolved interferogram signals to remove artifacts due to, for example, instrument functions in the auto-referenced spectra. Such low and medium frequency artifacts can cause difficulty in analysis of the resulting auto-referenced spectra. Medium frequency signals can be caused by either instrument effects or sample chemical effects, and specifically those due to instrument effects cannot be removed by using standard apodization shapes (e.g., triangle, Norton-Beer, cosine, etc.). For example, in the resulting auto-referenced absorbance/reflectance spectra of a chemical sample, the medium frequency signals create interference related to the quantification of smaller sample absorbance peaks that correspond to optical response signals of the constituent chemicals. Also, such signals render the use of theoretical, noise-free references difficult, resulting in the need to create references for each instrument or some other form of calibration or instrument function transform.

FIG. 2 is a diagram illustrating the effect of medium frequency signals on a resulting auto referenced absorbance spectra for a chemical sample. This auto referenced absorbance spectra 10 contains a medium frequency signal that is super imposed onto the high resolution chemical peak, interfering with its quantification. Specifically, the medium frequency signal is shown as three interference fringes 15a, 15b, 15c and the desired chemical peak is shown at 17.

The present invention is an improved apodization function and corresponding waveform that can be utilized in signal processing to substantially reduce, if not eliminate, low and medium frequency instrument background and artifact signals. In particular, application of embodiments of the apodization function are particularly effective when using an auto-referencing method for signal analysis, such as optical absorbance data analysis including Fourier Transform Infrared (FTIR) spectrometry, FT Near Infrared (FTNIR) spectrometry, etc.

In combination with such auto-referencing methods, embodiments of the invention utilize an apodization function and corresponding waveform that render the original and deresolved frequency spectra more similar for low and medium frequency signals, while retaining the high frequency signals only in the raw, original spectrum. When calculating the final auto-referenced absorbance spectrum, the ratio of the high resolution single beam spectrum to the deresolved single beam background spectrum retains mainly the chemically-relevant information, which can be more effectively analyzed.

Thus, embodiments of the present invention can extend the detection limit of low concentration components, and increase the precision and accuracy of the constituent analysis, especially for gas analysis of ultra-high purity gases and in particular for infrared spectrometry. Embodiments of the present invention can also facilitate more effective use of theoretical references, which do not contain any instrument effects, and no noise. Such embodiments can also reduce, if not eliminate, the need for calibration transfer methods that are instrument-specific which are necessary if instrument-related signals are left in the final spectrum.

While the issues of quantification are described below in particular for the auto-referenced method, embodiments of the apodization function and its corresponding waveforms are also applicable to normal methods of data acquisition. In particular, infrared spectrometry benefits from this method of apodization regardless if the auto-referenced background is used or not. Embodiments of the apodization function and corresponding waveform provide a good tradeoff between the amount of ringing and resolution and also helps to remove the instrument function to improve chemical quantification. This method is also applicable to other time oscillation methods, such as nuclear magnetic resonance (NMR), and particularly solid state FT-NMR that require methods such as Fourier Transforms to relate the time domain signals to frequency domain signals requiring a trade of signal to noise ratio to resolution. Embodiments of the apodization function and corresponding waveform can also be utilized in other spectroscopies that rely on flat baselines for quantification, such as the normal method of analysis applied to FT infrared spectrometry.

According to one embodiment, a method and apparatus of signal processing for use in spectrometry using an improved apodization function is disclosed that involves (i) obtaining a sample time domain waveform of a sample signal and a reference time domain waveform of a reference signal; (ii) providing a sample apodization waveform for application to the sample time domain waveform and a reference apodization waveform for application to the reference time domain waveform, each of the apodization waveforms comprising a first segment and a second segment, the first segment of the sample apodization waveform being substantially coextensive in length and having a substantially same weight profile as the first segment of the reference apodization waveform, the second segment of the sample and reference apodization waveforms each having a decaying weight profile; (iii) applying the sample and reference apodization waveforms to the sample and reference time domain waveforms, substantially same weight being applied by the first segment of the apodization waveforms to corresponding substantially coextensive regions of the sample and reference time domain waveforms, resulting in apodized sample and reference time domain waveforms; (iv) transforming the apodized sample and reference time domain waveforms into corresponding sample and reference frequency domain spectral waveforms; and (v) generating a referenced spectral analysis waveform as a ratio of the sample spectral waveform to the reference spectral waveform, the spectral analysis waveform substantially excluding frequencies associated with the corresponding coextensive regions of the apodized sample and reference time domain waveforms.

According to particular embodiments, the method and apparatus can provide the first segment of the sample and reference apodization waveforms with the same weight profile being a substantially constant magnitude.

According to particular embodiments, the method and apparatus can provide the first segment of the sample and reference apodization waveforms with the same weight profile having a varying magnitude.

According to particular embodiments, the method and apparatus can provide the first segment of the sample apodization waveform with a length that is shorter than the length of the first segment of the reference apodization waveform, and vice versa.

According to particular embodiments, the method and apparatus can provide the second segment of the apodization waveforms in the form of a cosine, Barlett, Blackman, Connes, Gaussian, Lorentzian, Hamming, Norton-Beer, Hanning, or Welch waveform. Other apodization waveforms known to those skilled in the art may also be utilized.

According to particular embodiments, the method and apparatus can (i) provide the second segment of the sample apodization waveform with a weight profile having a first rate of decay when applied to the sample time domain waveform; and (ii) can provide the second segment of the reference apodization waveform with the weight profile having a second rate of decay when applied to the reference time domain waveform, the first rate of decay being different than the second rate of decay.

According to particular embodiments, the method and apparatus can (i) provide the second segment of the sample apodization waveform with a first weight profile when applied to the sample time domain waveform; and (ii) provide the second segment of the reference apodization waveform with a second weight profile when applied to the reference time domain waveform, the second weight profile being different than the first weight profile.

According to particular embodiments, the sample time domain waveform and the reference time domain waveform can represent an optical response signal of one or more chemicals and the referenced spectral analysis waveform can represent an optical absorbance or reflectance spectrum of the one or more chemicals. Specifically, the chemical can a solid, liquid, a gas, or an intermediate stage therebetween.

According to particular embodiments, the application of the substantially same weight to the corresponding substantially coextensive regions of the sample and reference time domain waveforms results in substantial exclusion of frequencies from the spectral analysis waveform that are substantially unrelated to the optical response signal of the chemical.

According to particular embodiments, the method and apparatus can utilize a Fourier Transform Spectrometry device to obtain the sample time domain waveform. The Fourier Transform Spectrometry device can be a Fourier Transform Infrared (FTIR) spectrometry device.

According to another embodiment, a method and apparatus of signal processing for use in auto-referenced spectrometry using an improved apodization function is disclosed that involves (i) obtaining a sample time domain waveform of a sample signal; (ii) generating a reference time domain waveform from the sample time domain waveform; (iii) providing a sample apodization waveform for application to the sample time domain waveform and a reference apodization waveform for application to the reference time domain waveform, each of the apodization waveforms comprising a first segment and a second segment, the first segment of the sample apodization waveform being substantially coextensive in length and having a substantially same weight profile as the first segment of the reference apodization waveform, the second segment of the sample and reference apodization waveforms each having a decaying weight profile; (iv) applying the sample and reference apodization waveforms to the sample and reference time domain waveforms, substantially same weight being applied by the first segment of the apodization waveforms to corresponding substantially coextensive regions of the sample and reference time domain waveforms, resulting in apodized sample and reference time domain waveforms; (v) transforming the apodized sample and reference time domain waveforms into corresponding sample and reference frequency domain spectral waveforms; and (vi) generating an auto referenced spectral analysis waveform as a ratio of the sample spectral waveform to the reference spectral waveform, the auto referenced spectral analysis waveform substantially excluding frequencies generated from the first region of the apodized sample time domain waveform.

According to another embodiment, a method and apparatus of signal processing for use in spectrometry is disclosed that involves (i) obtaining a sample time domain waveform of a sample signal; (ii) providing an apodization waveform for application to the sample time domain waveform, the apodization waveform comprising a first segment and a second segment, the first segment having a substantially constant weight profile and the second segment having a substantially non-linear decaying weight profile; (iii) applying the apodization waveform to the sample time domain waveform, resulting in an apodized time domain waveform; (iv) transforming the apodized sample time domain waveform into a corresponding frequency domain spectral waveform; and (v) generating a spectral analysis waveform substantially excluding frequencies and artifacts associated with random noise and truncation error from the sample time domain waveform.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

An improved apodization function is provided that is capable of being executed by a processor or other computing device to generate an apodization waveform, for use in signal processing, such as infrared spectrometry. According to the invention, the apodization waveform includes multiple segments in series whereby each segment corresponds to a different weight profile. According to one embodiment, the apodization function can be a summation of two or more constituent apodization functions in series, capable of producing an apodization waveform where each segment of the waveform has a weight profile of one of the constituent apodization functions. The two or more constituent apodization functions can be selected depending on the particular application.

Figure 3A:
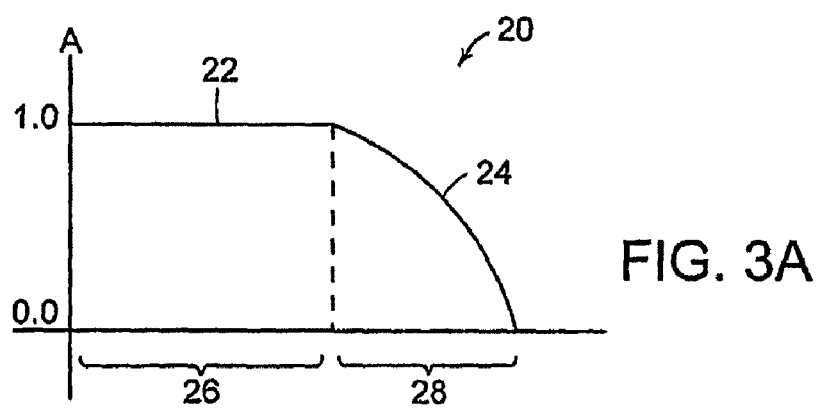
FIG. 3A is a diagram illustrating an apodization waveform that corresponds to an apodization function according to one embodiment.

For example, FIG. 3A is a diagram illustrating an apodization waveform that corresponds to an apodization function according to one embodiment. In this embodiment, the apodization function is a series summation of a unit multiplier and a cosine function that generates the apodization waveform 20. The apodization waveform 20 includes a uniform segment 22 having constant magnitude (e.g., magnitude=1) and a non-linear decaying segment 24. The uniform segment 22, which is applied over a region of low interferogram point numbers 26, enables oscillation of the interferogram signals for an extended period without dampening. Thus, upon transformation of the apodized interferogram into the frequency domain, the resulting spectra is of higher quality resolution. In contrast, the non-linear decaying segement 24, which is applied over a region of higher interferogram point numbers 28, dampens the interferogram signals towards zero, resulting in reduced truncation error and artifact ringing in the frequency domain. Thus, such embodiments of the apodization function and corresponding waveform provide an improved tradeoff of resolution to ringing.

Figure 3B:
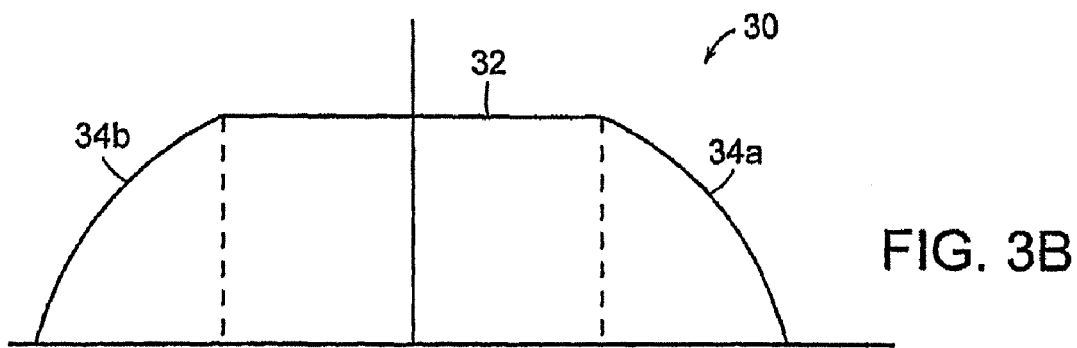
FIG. 3B is a diagram illustrating an apodization waveform that corresponds to an apodization function for use with double sided interferograms according to one embodiment.

FIG. 3B is a diagram illustrating an apodization waveform that corresponds to an apodization function for use with double sided interferograms according to one embodiment. In this embodiment, the apodization waveform 30 includes a uniform segment 32 and decaying segments 34a, 34b extending downward from both ends of the uniform segment 32.

Figure 1:
FIG. 1 is a diagram illustrating standard apodization functions and corresponding waveforms.
Figure 1A:
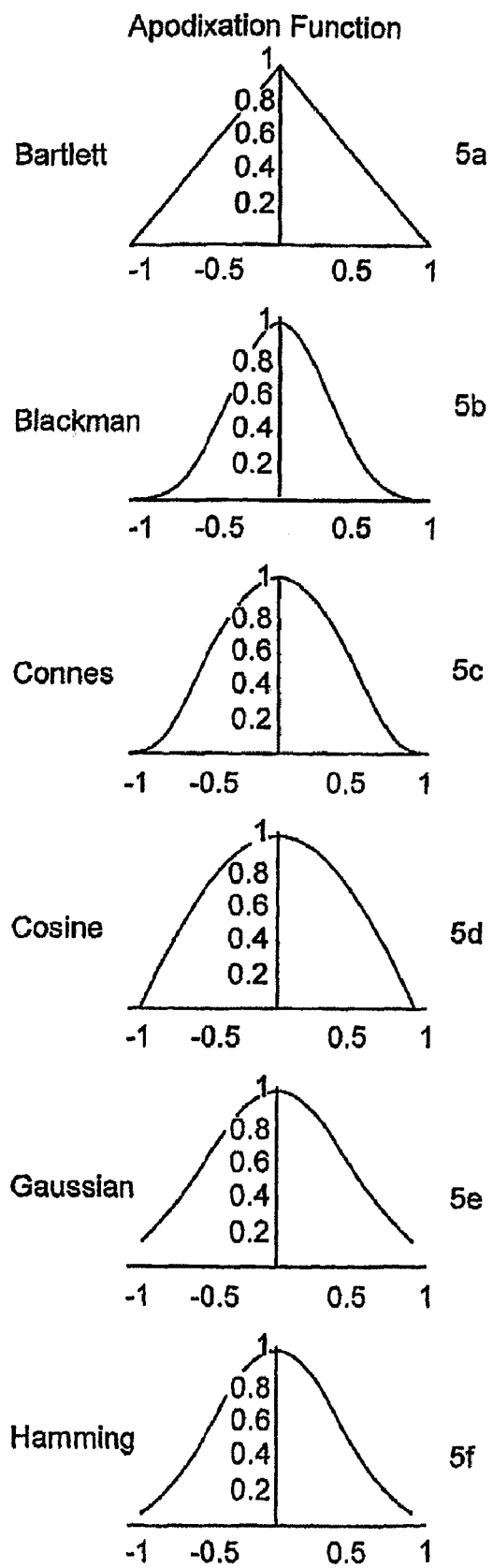
Figure 1B:
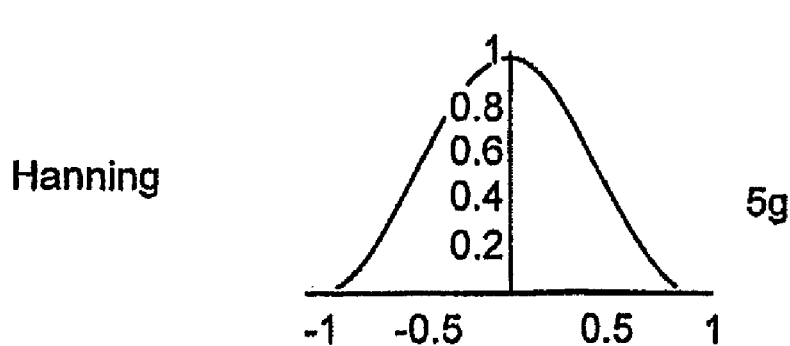
Figure 1B:
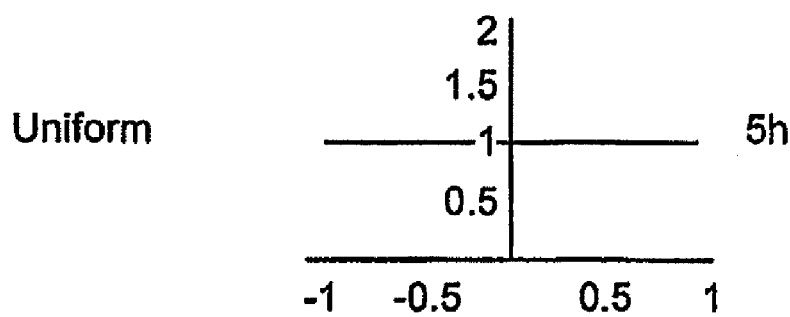
Figure 1B:
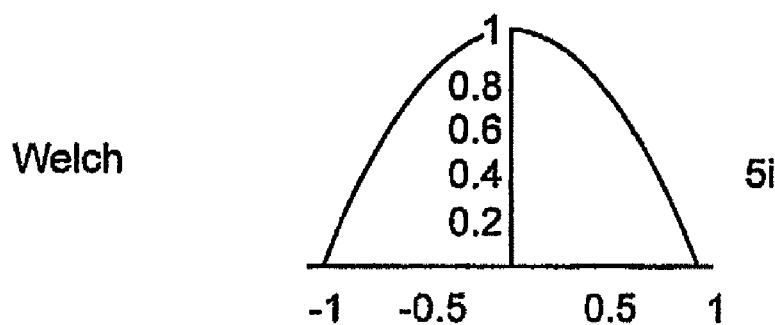
Figure 1B:
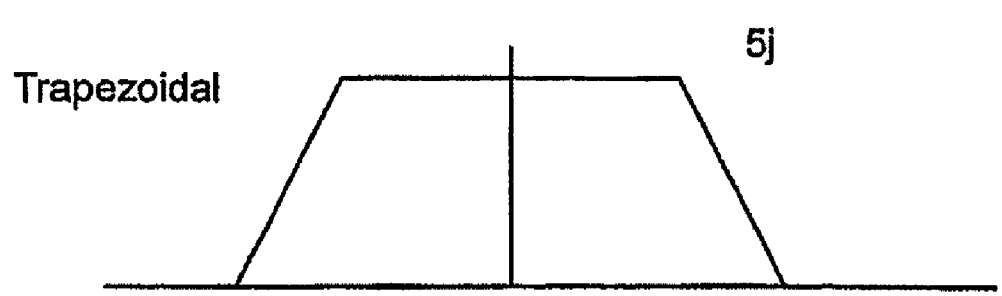
Figure 2:
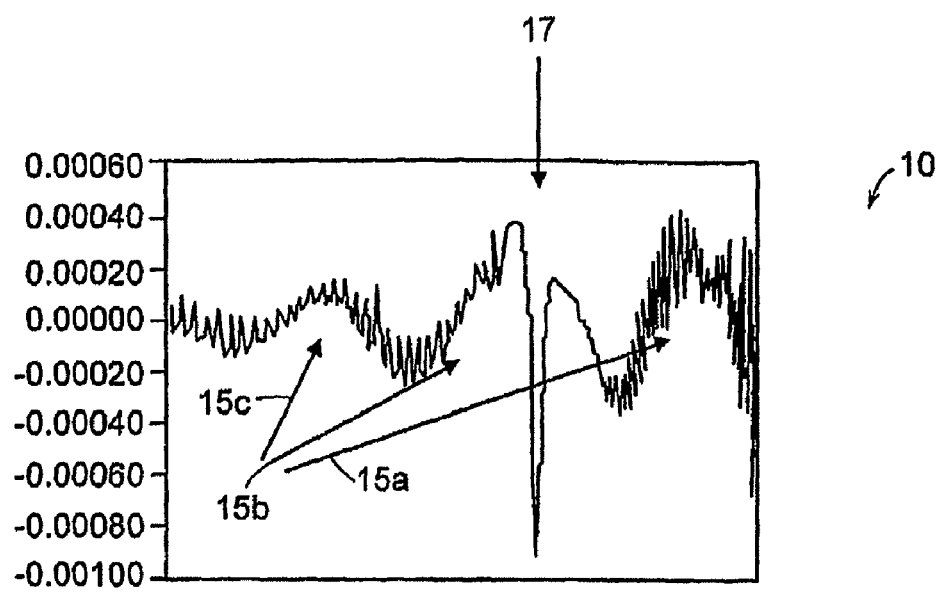
FIG. 2 is a diagram illustrating the effect of medium resolution signals on resulting auto-referenced absorbance spectra.

In alternative embodiments, the second segment of the apodization waveform can have a decaying weight profile that corresponds to any of the known apodization waveforms, such as those illustrated in FIG. 1 or other apodization waveforms known to those skilled in the art.

Embodiments of the apodization function and corresponding waveforms can be used in many other time varying spectroscopic techniques. Such techniques, although not so limited, include Fourier Transform Infrared (FTIR) spectrometry, and Auto-Referenced Fourier Transform Infrared (AR-FTIR) spectrometry.

Auto-Referenced Fourier Transform Infrared (AR-FTIR) spectrometry is a method of signal analysis in which a sample interferogram and a deresolved interferogram that is derived from the sample interferogram are used to generate an auto-referenced frequency spectrum in which low frequency signals that are common to the deresolved and sample spectrum are effectively canceled out, substantially leaving only the analytically relevant frequencies.

The present invention improves the precision and accuracy of such AR-FTIR methods. For example, in particular embodiments, the apodization function and corresponding waveform enable substantially the same weight profile to be applied to regions of the original sample and deresolved interferograms that generate the low and medium frequency signals of the original and deresolved absorbance spectra. Thus, these unwanted signals can be effectively removed from the resulting auto referenced spectra, making quantification of the high frequency signals easier.

In other words, removal of the low and medium frequency signals from the auto referenced spectra occurs by (i) applying substantially the same weight from the apodization function to regions of the original and deresolved interferograms which contain these signals to be removed (i.e, early interferogram points typically contain instrument function signals), and (ii) applying different weights to regions of the interferogram that contain the high-frequency signals typically represent the analytically-relevant signals.

Figure 4:
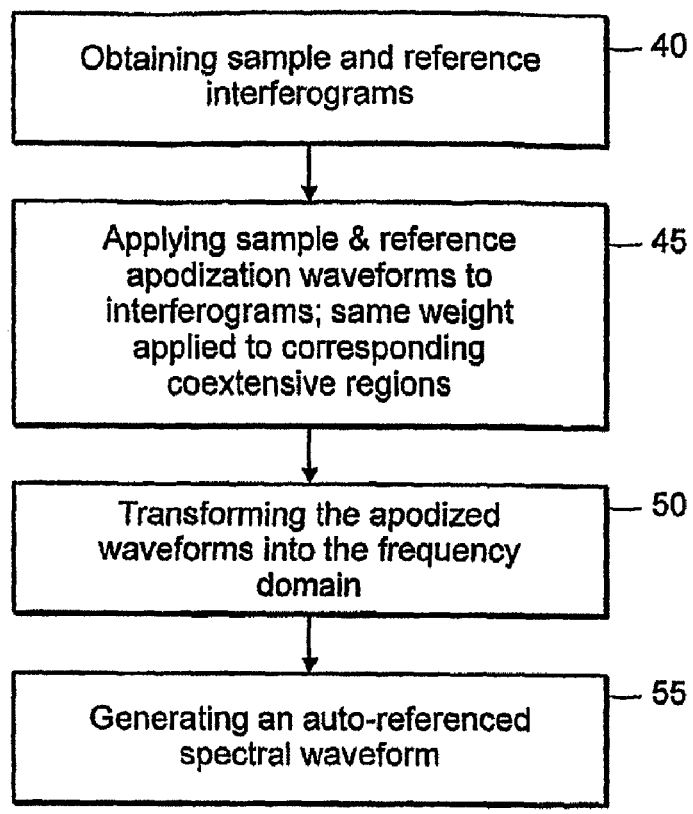
FIG. 4 is a flow chart illustrating a method of signal analysis for use in auto-referenced spectrometry according to one embodiment.

FIG. 4 is a flow chart illustrating a method of signal analysis for use in auto-referenced spectrometry using the apodization waveform according to one embodiment. At step 40, an original interferogram and that same interferogram deresolved according to a predetermined amount are obtained. The original interferogram is a raw measured signal in the form of a sampled time domain waveform that is obtained from a Fourier Transform Infrared (FTIR) spectrometer, for example. The original interferogram can also be generated through calculation of an interferogram for a theoretical sample. The deresolved interferogram, which serves as a reference, includes a copied or truncated region of the original interferogram, keeping only a small percentage of the first interferogram points that correspond to the predetermined deresolved value (e.g. deresolution is typically 4 to 16 times the original resolution value).

At step 45, a sample apodization waveform is applied to the original interferogram and a reference apodization waveform is applied to the deresolved interferogram. According to one embodiment, each of the apodization waveforms includes a first segment and a second segment. The first segment of the sample apodization waveform is substantially coextensive in length and has substantially the same weight profile as the first segment of the reference apodization waveform. However, there can be instances when it is beneficial to provide the first segment of the reference apodization waveform with a length that is shorter than the sample apodization waveform, and vice versa.

The second segment of each of the apodization waveforms has a decaying weight profile. Preferably, the second segment of the sample apodization waveform has a rate of decay that is different from the rate of the decay of the second segment of the reference apodization waveform.

The sample and reference apodization waveforms are applied to the respective interferograms, such that substantially the same weight is applied by the first segment of the apodization waveforms to corresponding coextensive regions of the sample and deresolved interferograms. Different weights are applied to a second region of the waveforms, resulting in the original and deresolved apodized waveforms.

Preferably, the apodization waveforms apply substantially the same weight to regions of the original and deresolved interferograms that contain the low and medium frequency signals (i.e. the earlier interferogram points). Typically, these regions include low point numbers of the interferograms. Thus, both low and medium frequency signals are significantly reduced in the auto-referenced spectrum with only the high frequency sample-relevant signals remaining.

The length of the first segment can be "tuned" to optimize the elimination of unwanted signals, while still keeping the highest possible resolution. For example, the length of the first segment may be dependent upon the frequency (peak width) of the artifact signals that are to be removed as well as of the frequency and final resolution of the chemical signal that is to be quantified. Typical values are a few percent of the total interferogram length, which can correspond to several tens of percent of the truncated interferogram length, depending on the extent of deresolution required to remove the baseline and other instrument artifacts from the raw signal. The length of the first segment is preferably kept smaller than the length of the truncated interferogram.

According to particular embodiments, the weight profile of the first segment of the apodization waveforms need not be a constant magnitude. Rather, the first segment of apodization can have a varying magnitude and perform equally as well.

At step 50, the original and deresolved apodized waveforms are transformed from the time domain into a frequency domain, resulting in the sample spectral waveform and the deresolved spectral waveform. For example, with the appropriate number of points in the interferogram (i.e. an integer power of 2) a Fast Fourier Transform (FFT) can be applied to both the original and deresolved apodized waveforms in order to obtain sample and deresolved single beam spectrums. A single beam spectrum is a spectral detector signal as a function of frequency in terms of wavenumber. For more information regarding Fast Fourier Transform analysis, refer to Griffiths et al.

At step 55, an auto-referenced spectral waveform for signal analysis is generated by calculating a ratio of the sample spectral waveform to the deresolved spectral waveform. In particular, the auto referenced absorbance spectrum is calculated by ratioing the single beam spectrum obtained at the original resolution by the same spectrum deresolved to a lower resolution used as the background spectrum, and taking the logarithm of the inverse ratio.

The resulting auto-referenced absorbance spectrum contains virtually all of the high-frequency signals (since those are present in the original spectrum but completely eliminated in the deresolved, background spectrum) and substantially no low or medium frequency signals (since those were present in both spectra, they are effectively eliminated). As a consequence, instrument functions, which are typically low and medium frequency signals, can be effectively eliminated while high resolution chemical signals are kept. The random noise signals are also suppressed since the apodization function used suppresses the signals at the very latter part of the interferogram. This approach allows the measurement of very small absorbance peaks, and as a consequence very low gas concentration in one particular embodiment.

Standard Fourier Transform Infrared Spectrometry (FTIR) is substantially identical to AR-FTIR spectrometry with the exception that the background or reference signal is not identical to the sample signal of the original interferogram. For example, in the case of FTIR spectrometry for chemical analysis, the original interferogram contains an optical absorbance/reflectance signal of the sample under analysis, while the reference interferogram contains an optical aborbance/reflectance signal of a predetermined known sample (e.g., Nitrogen) whose constituent chemical makeup is different from the sample under analysis.

Figure 5:
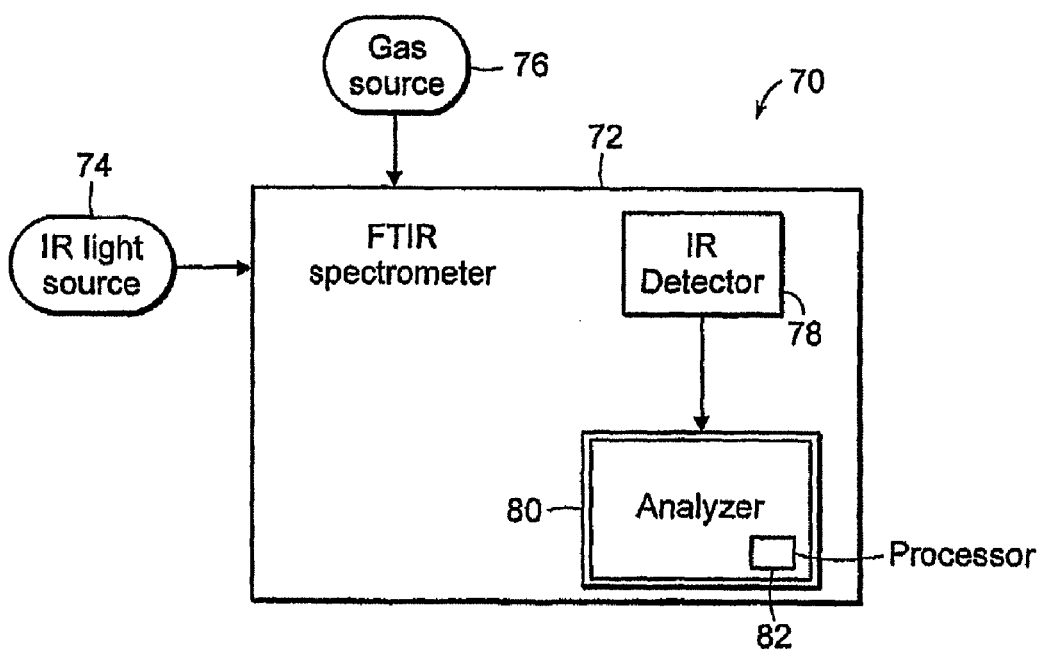
FIG. 5 is a diagram of a system including an analyzer for optical gas absorbance analysis according to one embodiment.

FIG. 5 is a diagram of a system including an analyzer for optical gas absorbance analysis according to one embodiment. A particular embodiment of this system is included in a currently unreleased version of the MultiGas™ Purity Analyzer from MKS Instruments® of Wilmington, Mass., providing real-time trace impurity detection at the part per billion (PPB) contaminate level detection in high purity gases such as NH3, NF3, and Hydrogen.

In this embodiment, the system includes a Fourier Transform Infrared (FTIR) spectrometer 72. The spectrometer receives as input an infrared (IR) beam from an IR light source 74 and gas to be analyzed from a gas source 76. An IR detector 78 detects and outputs an interferogram (not shown) that represents IR absorbance characteristics of the gas in the time domain. Specifically, the data comprising this interferogram is forwarded to an analyzer 80 that includes a processor 82 which implements the method of FIG. 4. This analyzer and/or processor can be internal to the FTIR system or external.

Figure 6A:
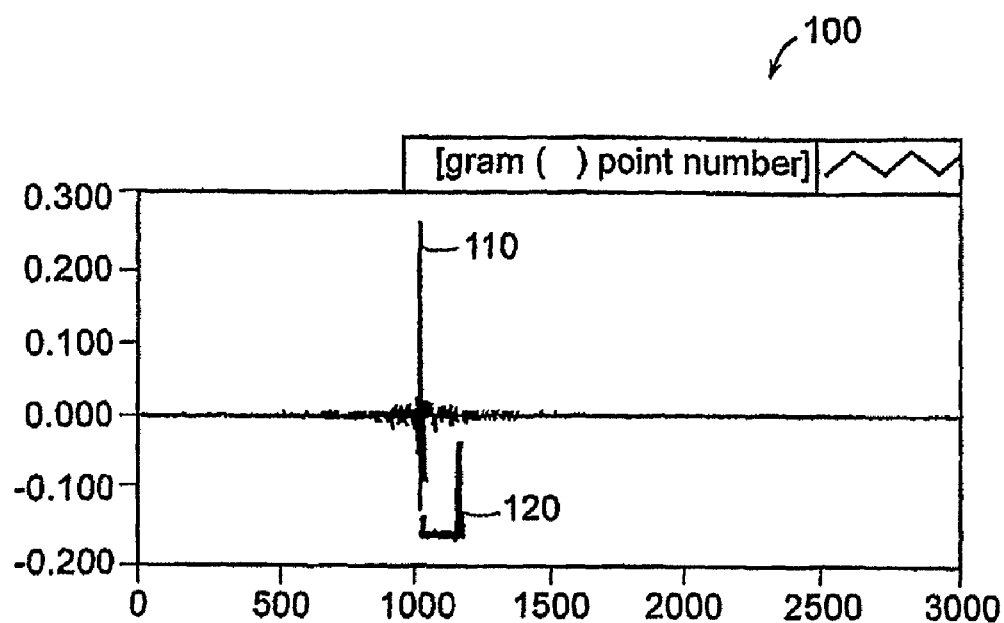
FIG. 6A is a diagram of an original interferogram according to one embodiment.

FIG. 6A is a diagram of an original interferogram according to one embodiment. Specifically, this figure is a detailed view of an original interferogram 100 at low point numbers between 0 and 3000. The actual interferogram may actual extend to any number representing the desired limit. A centerburst (i.e., position of largest signal) 110 is located at approximately point number 1000 in this example and corresponds to the start of the time decay interferogram representing the maximum signal of all of the convoluted signal including the instrument functions. The low frequency signals decay the fastest with the medium and high frequency signals extending further on either side of the centerburst. While this example is in particular for an interferogram belonging to the infrared spectrometer the overall information applies to other time varying experiments which do not contain double sided interferograms such as those described in the FTIR example. The general analysis of an interferogram from a spectrometer that collects slightly more than a single sided interferogram is described in detail in Griffiths et al.

The deresolved interferogram 120, which serves as a reference or background time domain waveform, is obtained by truncating the original interferogram to obtain a lower resolution spectrum. For example, if the original interferogram had n single side points (i.e., points to the right hand side of the centerburst 110), the deresolved interferogram includes the n/x first data points of the original interferogram where x is in general a number from 4 to 16 times less resolution than the original signal.

Figure 6B:
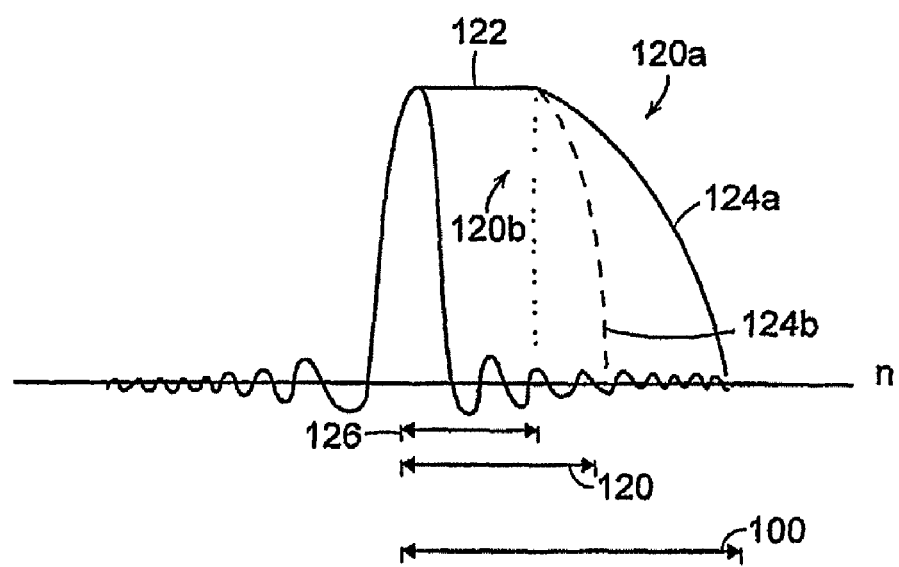
FIG. 6B is a diagram illustrating the application of the apodization waveform of FIG. 3 to the original and deresolved or truncated interferograms according to one embodiment.

FIG. 6B is a diagram illustrating the application of the apodization waveform of FIG. 3 to the original and deresolved interferograms according to one embodiment. In this embodiment, the apodization waveforms 120a, 120b have a shape comprising a uniform segment 122 having a constant magnitude and a decaying segment 124a, 124b in the form of a cosine. Even though the truncated deresolved interferogram has a length that is shorter than the original interferogram, the uniform segment 122 applies exactly the same weight to a low point number region 126 of these time domain waveforms.

Thus, when these apodized waveforms are transformed into the frequency domain, the resulting absorbance spectra corresponding to the original and deresolved interferograms capturing the low and medium frequency signals for subsequent removal from the auto referenced absorbance spectra, which is calculated from a ratio of the original and deresolved single beam spectra.

The decaying segment 124a, 124b of the apodization applies different weights to the latter regions of the original and deresolved time domain waveforms, which contain the high frequency signals. In particular, the decaying segment of apodization waveform 124a applies weights that decay from the constant magnitude of the uniform segment down to zero (or possibly other values when using other apodization function shapes). Conversely, the decaying segment 120b does not extend into the latter region and therefore applies a weight of zero. Thus, when these apodized waveforms are transformed into the frequency domain, the resulting absorbance spectra corresponding to the original interferogram capturing the high frequency signals, but the deresolved and transformed spectrum does not. Thus, the auto referenced spectrum includes data corresponding to the high frequency signals without interference from the low and medium frequency signals.

In addition to the apodization function, other filters or weighting functions, such as a Mertz function, can be additionally applied to interferograms. It is assumed that the net effect of all apodization and other filters and functions is considered and that those skilled in the art realize that an application of a filter preceding or following an apodization function is within the context of this discussion.

Figure 7:
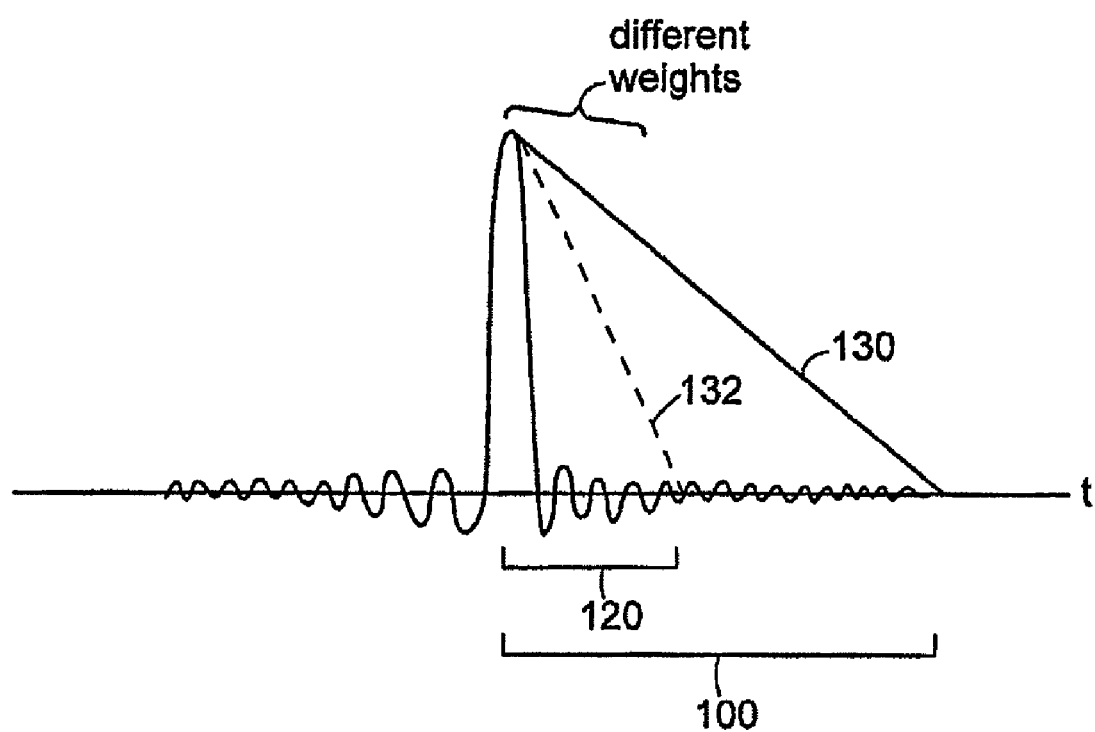
FIG. 7 is a diagram illustrating a known triangular apodization waveform being applied to the original and truncated interferograms.

By way of contrast, FIG. 7 is a diagram illustrating a known triangular apodization waveform being applied to the original and truncated interferograms. The same apodization function shape 130, 132 is applied to both the original interferogram 100 and the truncated interferogram 120. However, since both interferograms have different lengths, different effective weights are actually applied to the same interferogram point number. This apodized waveform does not apply the same weight to regions of the interferograms containing the low and medium frequency signals and thus cannot effectively remove the medium frequency signals from the final auto referenced absorbance spectra.

Figure 6C:
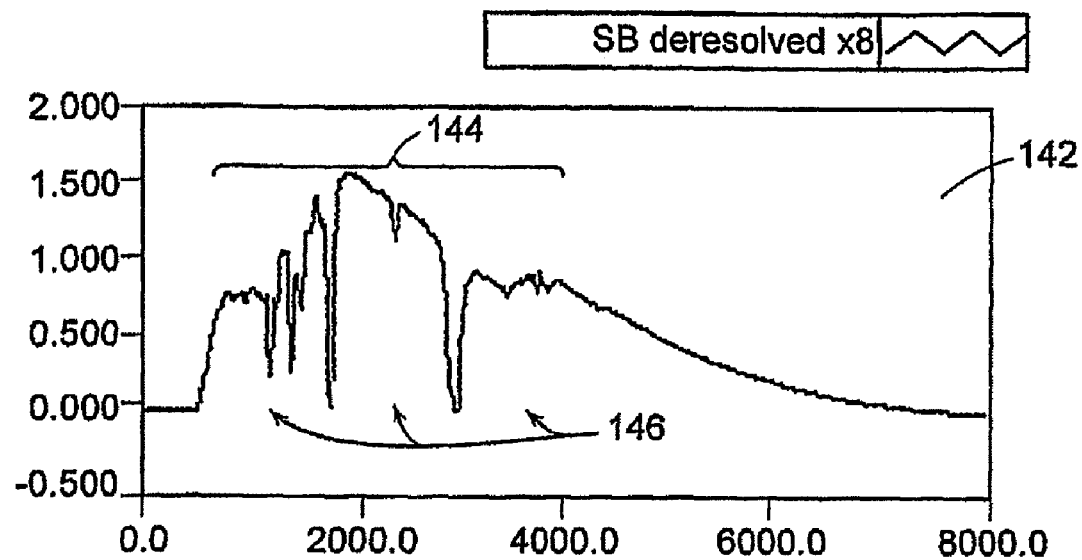
FIGS. 6C and 6D are diagrams illustrating single beam signals corresponding to the original and deresolved apodized interferograms transformed into the frequency domain according to one embodiment.
Figure 6D:
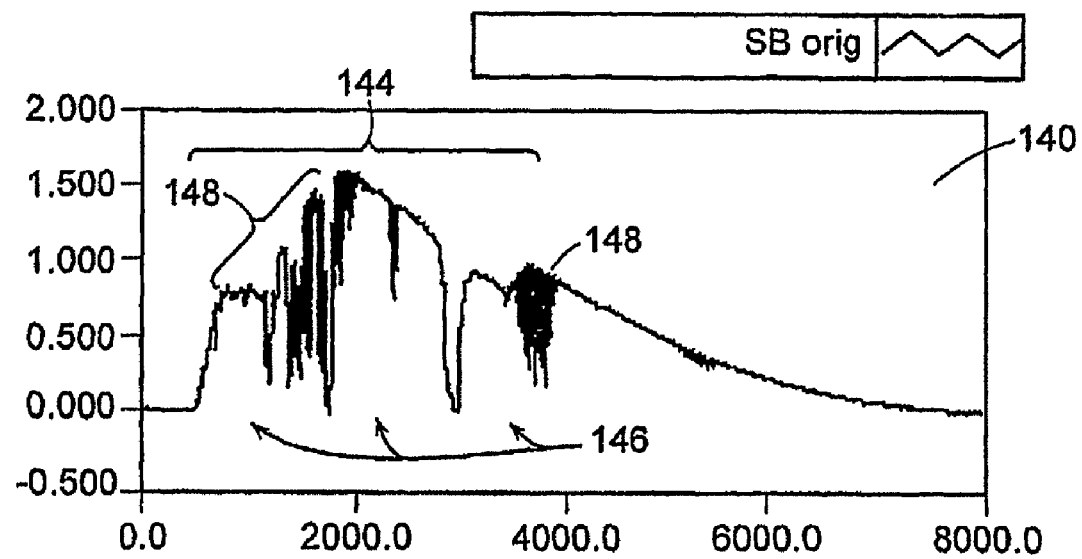

FIGS. 6C and 6D are diagrams illustrating single beam signals corresponding to the original and deresolved apodized interferograms transformed into the frequency domain according to one embodiment. A single beam signal represents intensity or energy versus wavenumber that can be obtained after processing the apodized interferogram through a Fast Fourier Transform (FFT). The low frequency or broad signal is the instrument function, the medium-frequency medium width peaks are either chemical signals or artifact from instrument signals (e.g., thin film interferences), and the high frequency or narrow peaks are chemical signals. The deresolved single beam spectrum obtained from the truncated interferogram (FIG. 6C) is "smoother" than the original single beam spectrum (FIG. 6D) and it contains low and medium frequency signals but no high-frequency signals.

Specifically, both the original and deresolved single beam spectra 140, 142 respectively include a low frequency signal 144 having a broad overall shape that is attributed to the instrument function of the spectrometer. Both the original and deresolved spectra also include medium frequency signals 146 that are either chemical signals or artifact instrument signals attributed to thin film interferences. In contrast, the original single beam spectrum 140 additionally includes high frequency signals 148 or the narrow peaks that correspond to the chemical signals.

Figure 6E:
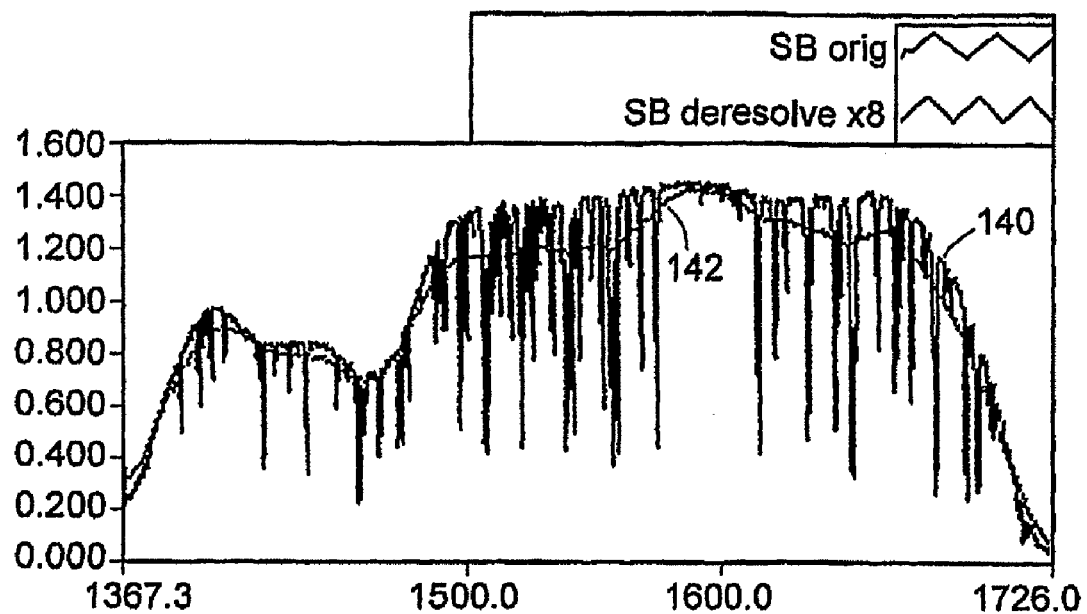
FIG. 6E is a diagram providing a detailed view of overlapping portions of the original and deresolved single beam spectra according to one embodiment.

FIG. 6E is a diagram providing a detailed view of overlapping portions of the original and deresolved single beam spectra according to one embodiment. This figure illustrates that the low and medium frequency signals 144, 146 of the deresolved single beam spectra 142 are similar to the low and medium frequency signals 144, 146 of the original absorbance spectra 140. Thus, taking a ratio of the two single beam spectra results in the cancellation of the low and medium frequency signals in the auto referenced spectra, but maintaining the high frequency signals as shown in FIG. 6F converted into absorbance.

Figure 6F:
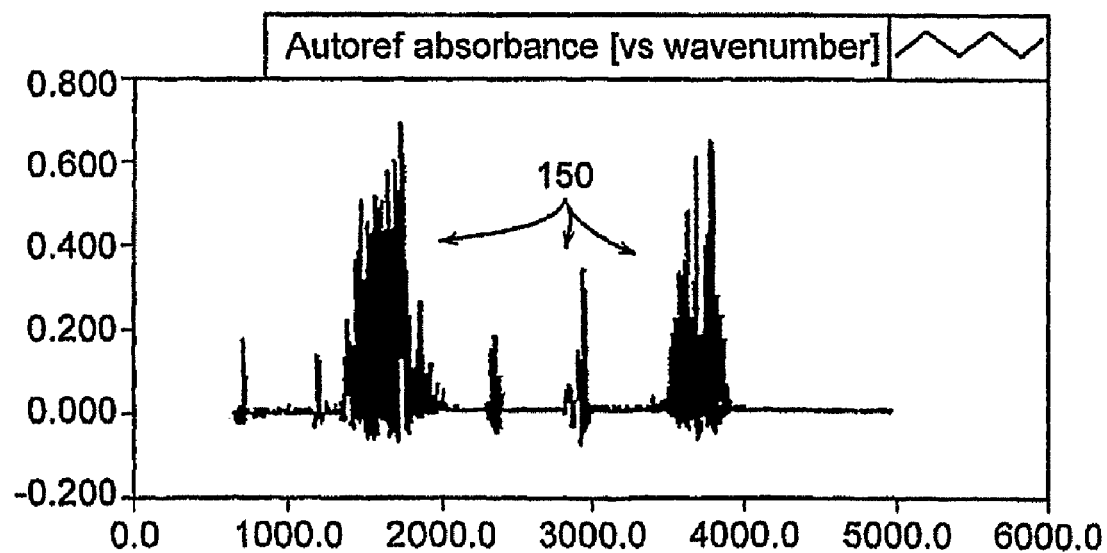
FIG. 6F is a diagram illustrating an example of the final auto-referenced absorbance spectrum (absorbance versus wavenumber) according to one embodiment.

FIG. 6F is a diagram illustrating an example of the final auto-referenced absorbance spectrum (absorbance versus wavenumber) according to one embodiment. As shown, only the high frequency narrow absorbance peaks 150 remain in the spectrum.

Figure 6G:
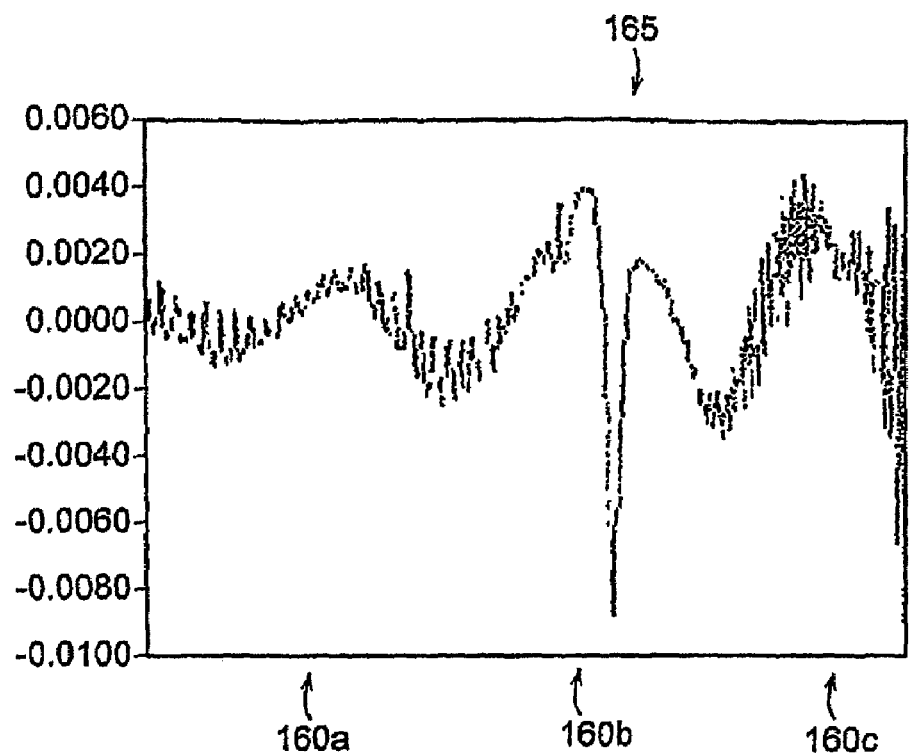
FIGS. 6G-6I are diagrams illustrating an example of the effectiveness of an embodiment of the optimized apodization function on an experimental auto-reference absorbance spectra.
Figure 6H:
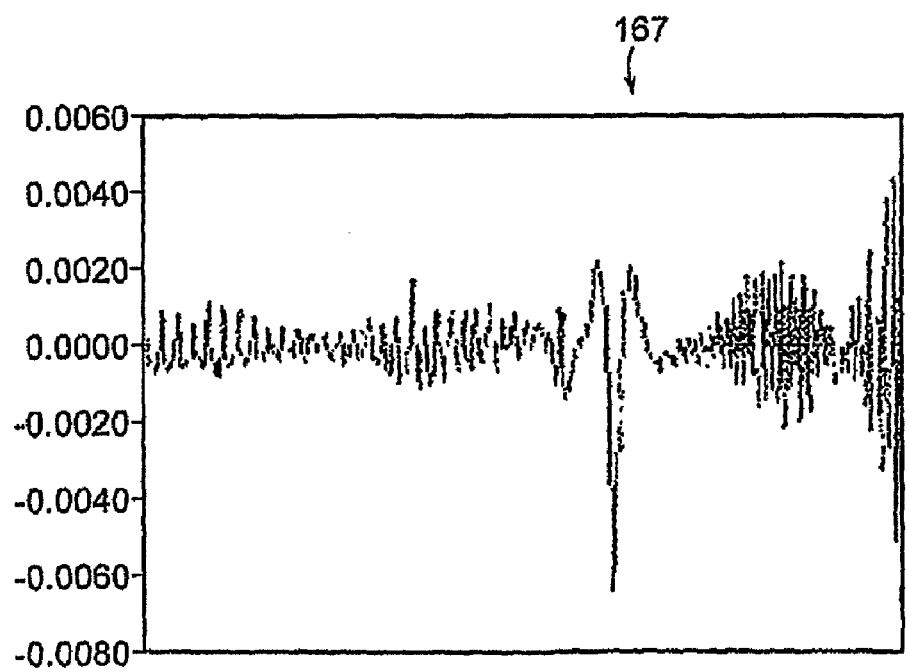
Figure 6I:
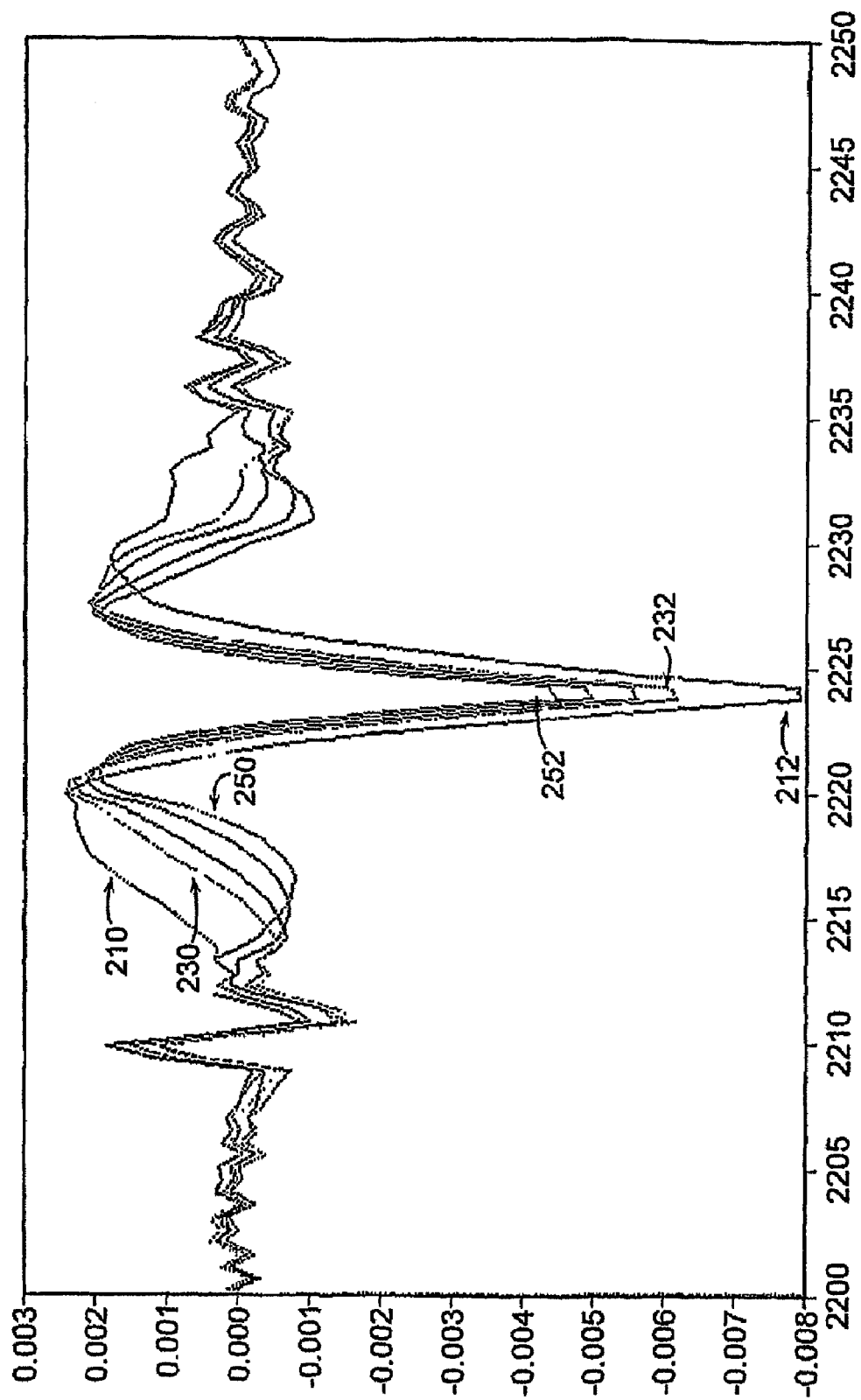

FIGS. 6G-6I are diagrams illustrating an example of the effectiveness of an embodiment of the optimized apodization function on an experimental auto referenced absorbance spectra. The auto referenced spectra of FIG. 6G is generated using a standard apodization function. As shown, the artifact medium frequency signals that are instrument-related (i.e., interference fringes 160a, 160b, 160c) are convoluted with the narrow high frequency chemical signal peak 165 and thus render the analysis difficult.

In contrast, the auto referenced spectra of FIG. 6H is generated using an apodization waveform in which the apodization waveform is a combination of a uniform segment and a cosine segment. As shown in FIG. 6H, the interference fringes are removed from the resulting auto referenced absorbance spectra, enabling more precision in quantifying the high frequency narrow chemical peak 167. Thus, since all the instrument artifact signals are more effectively reduced with the improved apodization with a minimal reduction in chemical signal, the analysis of the sample can yield lower detection limits, better precision and accuracy, and can be done using theoretical noise-free references, without the need for instrument specific calibrations or method transformations.

In order to optimize the detection limits, precision and accuracy, the length of the first segment of the sample, reference or both apodization waveforms can be adjusted.

According to particular embodiments, the length of the first segment (e.g., uniform segment) can be adjusted automatically depending on a combination of one or more of the following criteria: (i) identification of the target chemical impurities being analyzed, (ii) the instrument function and frequencies associated with the spectrometer in use; and (iii) identification of frequencies unrelated to the optical response signals of the target chemical impurities. For example, the length of the first segment of the apodization waveform can be generated to extend over a region of the sample and reference interferograms that include signals corresponding to the frequencies associated with instrument function and the unrelated frequencies. Such automated adjusted can be performed through the use of a lookup table or other I/O function, for example.

According to particular embodiments, the length of the uniform segment can also be manually configured through a user interface (not shown) to the analyzer 82 or a software implementation of the analyzer in which an end user specifies the length of the first segment of the apodization waveforms. Through manual configuration, the user can experiment with various settings to generate an apodization waveform that provides the strongest chemical peak information in the resulting referenced spectra with limited interference from frequencies and artifacts unrelated to the signals of interest.

For example, FIG. 6I is a signal diagram illustrating five examples that reflect how varying the length of the first segment of an apodization waveform affects the referenced spectra. In these examples, each of the apodization waveforms has a first segment having a constant magnitude and a second segment in the form of a decaying cosine waveform. The only difference between each of the apodization waveforms is the length of the first segment. In particular, the apodization waveform with the first segment having the shortest length corresponds to the resulting referenced spectra 210 in which the chemical signal peak 212 is the strongest but with more interference. Conversely, the apodization waveform with the first segment having the greatest length corresponds to the resulting referenced spectra 250 in which the chemical signal peak 252 is weaker but with less interference. The apodization waveform with the first segment having a length between the two previous examples provides a more optimal referenced spectra 240 in which the chemical signal peak 242 is strong and the amount of interference is effectively eliminated. According to another embodiment, the system of FIG. 5 can include an analyzer that generates auto referenced spectra for optical absorbance analysis for liquid, solid, gas and other intermediate phase material. In this embodiment, the impact on the low and medium frequency signals is adjusted so that sensitivity to the sample functions is not lost. Further embodiments replace the FTIR with that of other time varying apparatuses such as but not limited to nuclear magnetic resonance, FT-near infrared spectrometry and FT-Raman spectrometry.

The above-described techniques can be implemented in digital electronic circuitry, or in computer hardware, firmware, software, or in combinations of them. The implementation can also be in another form that is not electronic in nature but performs the same outcome of filtering. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of signal processing for use in spectrometry, comprising:

obtaining a sample time domain waveform of a sample signal and a reference time domain waveform of a reference signal;

obtaining a sample apodization waveform for application to the sample time domain waveform and a reference apodization waveform for application to the reference time domain waveform, each of the apodization waveforms comprising a first segment and a second segment extending from an end of the first segment, the first segment of the sample and reference apodization waveforms being substantially coextensive in length and comprising magnitudes representing a substantially same constant non-zero weight profile, the second segment of the sample and reference apodization waveforms each comprising magnitudes representing a non-linear decaying weight profile;

applying the sample and reference apodization waveforms to the sample and reference time domain waveforms, such that the substantially same constant non-zero weight profile is applied to corresponding substantially coextensive regions of the sample and reference time domain waveforms, resulting in apodized sample and reference time domain waveforms;

transforming the apodized sample and reference time domain waveforms into corresponding sample and reference frequency domain spectral waveforms; and generating a referenced spectral analysis waveform as a ratio of the sample spectral waveform to the reference spectral waveform, the spectral analysis waveform substantially excluding frequencies associated with the corresponding coextensive regions of the apodized sample and reference time domain waveforms.

2. The method of claim 1 further comprising:
providing the first segment of the sample apodization waveform with a length that is shorter than the length of the first segment of the reference apodization waveform.

3. The method of claim 2 further comprising:
providing the second segment of the sample apodization waveform with a first weight profile when applied to the sample time domain waveform; and
providing the second segment of the reference apodization waveform with a second weight profile when applied to the reference time domain waveform, the second weight profile being different than the first weight profile.

4. The method of claim 1 further comprising:
providing the first segment of the reference apodization waveform with a length that is shorter than the length of the first segment of the sample apodization waveform.

5. The method of claim 4 further comprising:
providing the second segment of the sample apodization waveform with a first weight profile when applied to the sample time domain waveform; and
providing the second segment of the reference apodization waveform with a second weight profile when applied to the reference time domain waveform, the second weight profile being different than the first weight profile.

6. The method of claim 1 wherein the second segment of the apodization waveforms comprises a cosine, Barlett, Blackman, Connes, Gaussian, Lorentzian, Hamming, Norton-Beer, Hanning, or Welch waveform.

7. The method of claim 1 further comprising:
providing the second segment of the sample apodization waveform with a weight profile having a first rate of decay when applied to the sample time domain waveform; and
providing the second segment of the reference apodization waveform with the weight profile having a second rate of decay when applied to the reference time domain waveform, the first rate of decay being different than the second rate of decay.

8. The method of claim 1 further comprising:
providing the second segment of the sample apodization waveform with a first weight profile when applied to the sample time domain waveform; and
providing the second segment of the reference apodization waveform with a second weight profile when applied to the reference time domain waveform, the second weight profile being different than the first weight profile.

9. The method of claim 1 wherein the sample time domain waveform and the reference time domain waveform represent an optical response signal of one or more chemicals and the referenced spectral analysis waveform represents an optical absorbance or reflectance spectrum of the one or more chemicals.

10. The method of claim 9 wherein the application of the substantially same weight to the corresponding coextensive regions of the sample and reference time domain waveforms results in substantial exclusion of frequencies from the spectral analysis waveform that are substantially unrelated to the optical response signal of the one or more chemicals.

11. The method of claim 9 wherein the one or more chemicals is a solid, liquid, a gas, or an intermediate stage therebetween.

12. The method of claim 1 further comprising:
utilizing a Fourier Transform Spectrometry device to obtain the sample time domain waveform.

13. The method of claim 12 wherein the Fourier Transform Spectrometry device is a Fourier Transform Infrared Spectrometry (FTIR) device.

14. The method of claim 1 wherein the sample signal and the reference signal are identical, and the method further comprises:
generating the reference time domain waveform by copying the sample time domain waveform.

15. The method of claim 1 wherein the sample signal and the reference signal are identical, and the method further comprises:
generating the reference time domain waveform by truncating a region of the sample time domain waveform.

16. The method of claim 1 wherein the sample time domain waveform is obtained through experimental measurements or theoretical calculations.

17. The method of claim 1 wherein the length of the first segment of the sample apodization waveform and the length of the first segment of the reference apodization waveform can be adjusted.

18. A method of signal processing for use in auto referenced signal spectrometry, comprising:
obtaining a sample time domain waveform of a sample signal;
generating a reference time domain waveform from the sample time domain waveform;
obtaining a sample apodization waveform for application to the sample time domain waveform and a reference apodization waveform for application to the reference time domain waveform, each of the apodization waveforms comprising a first segment and a second segment extending from an end of the first segment, the first segment of the sample and reference apodization waveforms being substantially coextensive in length and comprising magnitudes representing a substantially same constant non-zero weight profile the second segment of the sample and reference apodization waveforms each comprising magnitudes representing a non-linear decaying weight profile;
applying the sample and reference apodization waveforms to the sample and reference time domain waveforms, such that the substantially same constant non-zero weight profile is applied to corresponding substantially coextensive regions of the sample and reference time domain waveforms, resulting in apodized sample and reference time domain waveforms;
transforming the apodized sample and reference time domain waveforms into corresponding sample and reference frequency domain spectral waveforms; and
generating an auto referenced spectral analysis waveform as a ratio of the sample spectral waveform to the reference spectral waveform, the auto referenced spectral analysis waveform substantially excluding frequencies generated from the first region of the apodized sample time domain waveform.

19. The method of claim 18 further comprises generating the reference time domain waveform from the sample time domain waveform by truncating a region of the sample time domain waveform.

20. A method of signal processing for use in spectrometry comprising:
obtaining a sample time domain waveform of a sample signal;

obtaining an apodization waveform for application to the sample time domain waveform, the apodization waveform comprising a first segment and a second segment extending from an end of the first segment, the first segment comprising magnitudes representing a substantially constant non-zero weight profile and the second segment comprising magnitudes representing a substantially non-linear decaying weight profile;

applying the apodization waveform to the sample time domain waveform, resulting in an apodized time domain waveform;

transforming the apodized sample time domain waveform into a corresponding frequency domain spectral waveform; and generating a spectral analysis waveform substantially excluding frequencies and artifacts associated with random noise and truncation error from the sample time domain waveform.

21. A signal processing apparatus for use in auto referenced signal spectrometry, comprising:

a processor obtaining a sample time domain waveform of a sample signal;

the processor generating a reference time domain waveform from the sample time domain waveform;

the processor obtaining a sample apodization waveform for application to the sample time domain waveform and a reference apodization waveform for application to the reference time domain waveform, each of the apodization waveforms comprising a first segment and a second segment extending from an end of the first segment, the first segment of the sample and reference apodization waveforms being substantially coextensive in length and comprising magnitudes representing a substantially same constant non-zero weight profile the second segment of the sample and reference apodization waveforms each comprising magnitudes representing a non-linear decaying weight profile;

the processor applying the sample and reference apodization waveforms to the sample and reference time domain waveforms, such that the substantially same constant non-zero weight profile is applied to corresponding substantially coextensive regions of the sample and reference time domain waveforms, resulting in apodized sample and reference time domain waveforms;

the processor transforming the apodized sample and reference time domain waveforms into corresponding sample and reference frequency domain spectral waveforms; and the processor generating an auto referenced spectral analysis waveform as a ratio of the sample spectral waveform to the reference spectral waveform, the auto referenced spectral analysis waveform substantially excluding frequencies generated from the first region of the apodized sample time domain waveform.

22. A computer program product, tangibly embodied in a computer readable medium, for signal spectrometry, comprising instructions being executable to cause data processing apparatus to:

obtain a sample time domain waveform of a sample signal and a reference time domain waveform of a reference signal;

obtain a sample apodization waveform for application to the sample time domain waveform and a reference apodization waveform for application to the reference time domain waveform, each of the apodization waveforms comprising a first segment and a second segment extending from an end of the first segment, the first segment of the sample and reference apodization waveforms being substantially coextensive in length and comprising magnitudes representing a substantially same constant non-zero weight profile the second segment of the sample and reference apodization waveforms each comprising magnitudes representing a non-linear decaying weight profile;

apply the sample and reference apodization waveforms to the sample and reference time domain waveforms, such that the substantially same constant non-zero weight profile is applied to corresponding substantially coextensive regions of the sample and reference time domain waveforms, resulting in apodized sample and reference time domain waveforms;

transform the apodized sample and reference time domain waveforms into corresponding sample and reference frequency domain spectral waveforms; and generate a referenced spectral analysis waveform as a ratio of the sample spectral waveform to the reference spectral waveform, the spectral analysis waveform substantially excluding frequencies associated with the corresponding coextensive regions of the apodized sample and reference time domain waveforms.

23. A computer program product, tangibly embodied in a computer readable medium, for auto-referenced signal spectrometry, comprising instructions being executable to cause data processing apparatus to:

obtain a sample time domain waveform of a sample signal;

generate a reference time domain waveform from the sample time domain waveform;

obtain a sample apodization waveform for application to the sample time domain waveform and a reference apodization waveform for application to the reference time domain waveform, each of the apodization waveforms comprising a first segment and a second segment extending from an end of the first segment, the first segment of the sample and reference apodization waveforms being substantially coextensive in length and comprising magnitudes representing a substantially same constant non-zero weight profile the second segment of the sample and reference apodization waveforms each comprising magnitudes representing a non-linear decaying weight profile;

apply the sample and reference apodization waveforms to the sample and reference time domain waveforms, such that the substantially same constant non-zero weight profile is applied to corresponding substantially coextensive regions of the sample and reference time domain waveforms, resulting in apodized sample and reference time domain waveforms;

transform the apodized sample and reference time domain waveforms into corresponding sample and reference frequency domain spectral waveforms; and generate an auto referenced spectral analysis waveform as a ratio of the sample spectral waveform to the reference spectral waveform, the auto referenced spectral analysis waveform substantially excluding frequencies generated from the first region of the apodized sample time domain waveform.

24. A computer program product, tangibly embodied in a computer readable medium, for signal spectrometry, comprising instructions being executable to cause data processing apparatus to:

obtain a sample time domain waveform of a sample signal;

obtain an apodization waveform for application to the sample time domain waveform, the apodization waveform comprising a first segment and a second segment extending from an end of the first segment, the first segment comprising magnitudes representing a substantially constant non-zero weight profile and the second segment comprising magnitudes representing a substantially non-linear decaying weight profile;

apply the apodization waveform to the sample time domain waveform, resulting in an apodized time domain waveform;

transform the apodized sample time domain waveform into a corresponding frequency domain spectral waveform; and generate a spectral analysis waveform substantially excluding frequencies and artifacts associated with random noise and truncation error from the sample time domain waveform.

\* \* \* \* \*